United States Patent
Boutboul et al.

(10) Patent No.: US 8,332,609 B2
(45) Date of Patent: Dec. 11, 2012

(54) METHOD, SYSTEM AND PROGRAM PRODUCT FOR STORING DOWNLOADABLE CONTENT ON A PLURALITY OF ENTERPRISE STORAGE SYSTEM (ESS) CELLS

(75) Inventors: Irwin Boutboul, White Plains, NY (US); Moon J. Kim, Wappingers Falls, NY (US); Dikran Meliksetian, Danbury, CT (US); Robert G. Oesterlin, Rochester, MN (US); Anthony Ravinsky, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 11/864,167

(22) Filed: Sep. 28, 2007

(65) Prior Publication Data
US 2008/0022067 A1 Jan. 24, 2008

Related U.S. Application Data

(63) Continuation of application No. 10/890,853, filed on Jul. 13, 2004, now Pat. No. 7,277,985.

(51) Int. Cl.
*G06F 12/00* (2006.01)
(52) U.S. Cl. .......................... 711/170; 711/172
(58) Field of Classification Search .................. 711/170
See application file for complete search history.

(56) References Cited

U.S. PATENT DOCUMENTS

| | | | |
|---|---|---|---|
| 4,528,624 A | 7/1985 | Kamionka et al. | |
| 5,659,786 A | 8/1997 | George et al. | |
| 5,784,702 A | 7/1998 | Greenstein et al. | |
| 6,003,045 A | 12/1999 | Freotas et al. | |
| 6,061,720 A | 5/2000 | Kamel et al. | |
| 6,170,016 B1 | 1/2001 | Nakai et al. | |
| 6,247,109 B1 | 6/2001 | Kleinsorge et al. | |
| 6,339,785 B1 | 1/2002 | Feigenbaum | |
| 6,381,709 B1 | 4/2002 | Casagrande et al. | |
| 6,407,752 B1 | 6/2002 | Harnett | |
| 6,477,522 B1 | 11/2002 | Young | |
| 6,587,938 B1 | 7/2003 | Eilert et al. | |

(Continued)

FOREIGN PATENT DOCUMENTS

JP 2002268979 A 9/2002

(Continued)

OTHER PUBLICATIONS

PCT Written Opinion of the International Searching Authority, PCT/EP2005/053000, Aug. 17, 2005.

(Continued)

*Primary Examiner* — Tuan Thai
*Assistant Examiner* — Ngoc Dinh
(74) *Attorney, Agent, or Firm* — William E. Schiesser; Hoffman Warnick LLC (57) ABSTRACT

The present invention takes advantage of unused storage space within the ESS cells to provide for the efficient and cost effective storage of downloadable content. Specifically, the system of the present invention generally includes a download grid manager that communicates with the ESS cells. Content to be replicated to the ESS cells, and characteristics corresponding thereto, are received on the download grid manager from a content owner (or the like). Based on the characteristics, a storage policy, and storage information previously received from the ESS cells, the download grid manager will replicate the downloadable content to unused storage space within the ESS cells.

22 Claims, 3 Drawing Sheets

U.S. PATENT DOCUMENTS

| | | | |
|---|---|---|---|
| 6,597,956 B1 | 7/2003 | Aziz et al. | |
| 6,606,646 B2 | 8/2003 | Feigenbaum | |
| 6,678,733 B1 | 1/2004 | Brown et al. | |
| 6,742,023 B1 | 5/2004 | Fanning et al. | |
| 6,772,217 B1 | 8/2004 | Baumann et al. | |
| 6,853,960 B2 | 2/2005 | Yamanaka et al. | |
| 6,920,110 B2 | 7/2005 | Roberts et al. | |
| 6,952,737 B1* | 10/2005 | Coates et al. | 709/229 |
| 6,961,858 B2 | 11/2005 | Fransdonk | |
| 7,047,309 B2 | 5/2006 | Baumann et al. | |
| 7,272,613 B2 | 9/2007 | Sim et al. | |
| 7,277,938 B2 | 10/2007 | Duimovich et al. | |
| 7,324,228 B2 | 1/2008 | Chiarabini et al. | |
| 7,631,098 B2 | 12/2009 | Boutboul et al. | |
| 2001/0029519 A1 | 10/2001 | Hallinan et al. | |
| 2001/0034812 A1 | 10/2001 | Ignatius et al. | |
| 2002/0039196 A1 | 4/2002 | Chiarabini et al. | |
| 2002/0049778 A1* | 4/2002 | Bell et al. | 707/200 |
| 2002/0099844 A1 | 7/2002 | Baumann et al. | |
| 2002/0107968 A1 | 8/2002 | Horn et al. | |
| 2002/0116082 A1 | 8/2002 | Gudorf | |
| 2002/0129085 A1 | 9/2002 | Kubala et al. | |
| 2003/0046270 A1 | 3/2003 | Leung et al. | |
| 2003/0046357 A1 | 3/2003 | Doyle et al. | |
| 2003/0051059 A1 | 3/2003 | Zondervan et al. | |
| 2003/0074465 A1 | 4/2003 | Tang et al. | |
| 2003/0084123 A1 | 5/2003 | Kamel | |
| 2003/0084280 A1 | 5/2003 | Bryan et al. | |
| 2003/0101446 A1 | 5/2003 | McManus et al. | |
| 2003/0120701 A1 | 6/2003 | Pulsipher et al. | |
| 2003/0126265 A1 | 7/2003 | Aziz et al. | |
| 2004/0039887 A1 | 2/2004 | Gautney | |
| 2004/0172476 A1 | 9/2004 | Chapweske | |
| 2005/0015511 A1 | 1/2005 | Izmailov et al. | |
| 2005/0033856 A1 | 2/2005 | Li | |
| 2005/0124317 A1 | 6/2005 | Kaplan | |
| 2005/0166011 A1* | 7/2005 | Burnett et al. | 711/112 |
| 2006/0064383 A1 | 3/2006 | Marking | |
| 2006/0064386 A1 | 3/2006 | Marking | |
| 2007/0150481 A1 | 6/2007 | Song et al. | |
| 2009/0327512 A1* | 12/2009 | Chapweske | 709/232 |

FOREIGN PATENT DOCUMENTS

| | | |
|---|---|---|
| JP | 2003067280 A | 3/2003 |
| JP | 2003337803 | 11/2003 |
| WO | 03046721 A1 | 6/2003 |
| WO | 2005122532 A1 | 12/2005 |

OTHER PUBLICATIONS

Foster et al., "The Physiology of the Grid—An Open Grid Services Architecture for Distributed Systems Integration," Jun. 2002, pp. 1-31, retrieved from: http://www.globus.org/alliance/publications/papers/ogsa.pdf.

Liljeqvist et al., "Grid Computing Distribution Using Network Processors," Nov. 2002, 8 pages, In Proceedings of PDCS'02 (14th Parallel and Distributed Computing Conference 2002) Conference, retrieved from: http://citeseerx.ist.psu.edu/viewdoc/summary?doi=10.1.1.93.53.

Higgins et al., "Slyck's Guide to BitTorrent," May 2003, pp. 1-3, MP3 Newswire.net, retrieved from: http://www.mp3newswire.net/stories/2003/BitTorrent.html.

Waseem, Notice of Allowance and Fee(s) Due for U.S. Appl. No. 10/862,977 dated Apr. 9, 2009, 12 pages.

Waseem, Office Action Communication for U.S. Appl. No. 10/862,977 dated Oct. 28, 2008, 28 pages.

Waseem, Office Action Communication for U.S. Appl. No. 10/862,977 dated Jul. 22, 2008, 35 pages.

Waseem, Office Action Communication for U.S. Appl. No. 10/862,977 dated Jan. 23, 2008, 34 pages.

Dinh, Notice of Allowance and Fee(s) Due for U.S. Appl. No. 10/890,853 dated May 30, 2007, 7 pages.

Dinh, Office Action Communication for U.S. Appl. No. 10/890,853 dated Dec. 22, 2006, 11 pages.

Patent Cooperation Treaty, PCT International Written Opinion of the International Searching Authority and International Search Report for PCT/EP2005/052600 dated Dec. 8, 2006, 10 pages.

Waseem, Notice of Allowance and Fee(s) Due for U.S. Appl. No. 10/862,977 dated Jul. 8, 2009, 10 pages.

* cited by examiner

METHOD, SYSTEM AND PROGRAM PRODUCT FOR STORING DOWNLOADABLE CONTENT ON A PLURALITY OF ENTERPRISE STORAGE SYSTEM (ESS) CELLS

CROSS-REFERENCE TO RELATED APPLICATION

This application is a continuation application of U.S. patent application Ser. No. 10/890,853 filed Jul. 13, 2004, now U.S. Pat. No. 7,277,985. This application is related in some aspects to U.S. patent application Ser. No. 10/862,977, entitled Method, System and Program Product for Optimized Concurrent Data Download Within a Grid Computing Environment, filed Jun. 8, 2004, which is herein incorporated by reference.

FIELD OF THE INVENTION

In general, the present invention provides a method, system and program product for storing/replicating downloadable content on a plurality of Enterprise Storage System (ESS) cells. Specifically, the present invention takes advantage of unused storage space (e.g., "White Space") within the ESS cells to provide for the efficient and cost effective storage of downloadable content.

BACKGROUND OF THE INVENTION

As the use of information technology (IT) becomes more prevalent, it has become increasingly common for many organizations to use an Enterprise Storage System (ESS) for storing files and the like. In an ESS, multiple data storage cells or farms are provided at different geographic locations throughout the country or world. These cells can be used for sharing files among individuals within the organizations. For example, International Business Machines Corp. of Armonk, N.Y. uses a technology known as the Global Storage Architecture (GSA) for file sharing. Under the GSA, storage cells are positioned at various locations throughout the world. Based on different criteria, content is stored to the cells.

Figure 1:
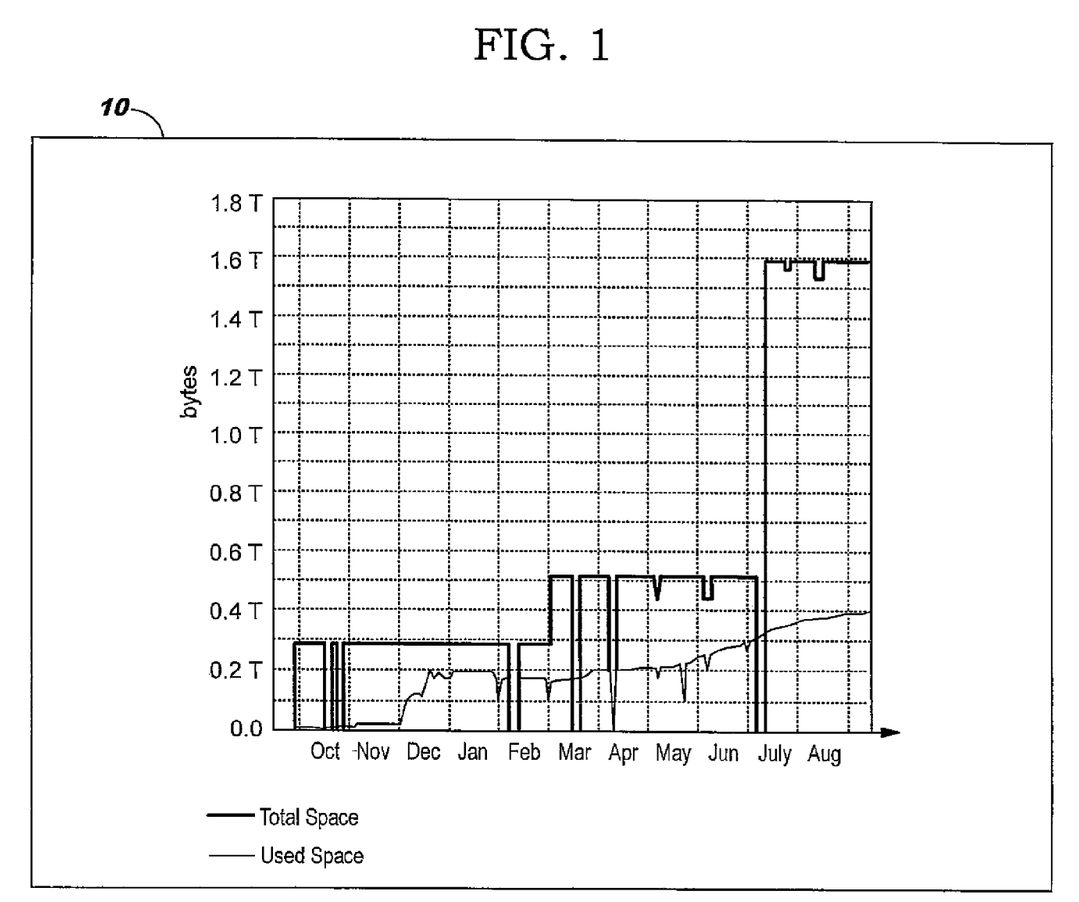
FIG. 1 depicts a graph showing total space and unused space for an illustrative ESS cell.

Currently, IBM offers 25 GSA sites worldwide with plans to expand in the future. However, like many ESS's, a vast quantity of storage resources throughout the GSA are underutilized and unbalanced due to the clustering design that is based on physical location. Specifically, depending on geographic location, content is sent to a designated storage location. Because of this constraint, typical storage systems are designed and provisioned with a target average utilization, which has traditionally been unbalanced among the cells. In fact, as can be seen from graph 10 of FIG. 1, it is common for ESS cells to have vast quantities of unused space, which will continue to go underutilized. Specifically, FIG. 1 shows the used and unused storage space for an illustrative ESS cell. As can be seen in the month of August, only about 0.4 TB of the available 1.6 TB were utilized. This indicates that about 1.2 TB of this ESS cell is unused (e.g., White Space).

One previous development by IBM for fine tuning the storage methodology for an ESS was the subject of U.S. patent application Ser. No. 10/718,419, filed Nov. 20, 2003, and entitled Computerized System, Method and Program Product for managing an Enterprise Storage System, herein incorporated by reference. Under this previous application, files/content are stored on certain ESS cells based on various performance parameters. Such parameters include, among others, storage costs.

As advantageous as this previous development has been, no existing system provides a way to store content to GSA cells based on the unused storage space therein. That is, no previous system takes advantage of the unused storage space in ESS cells.

In view of the foregoing, there exists a need for a method, system and program product for storing/replicating downloadable content on a plurality of Enterprise Storage System (ESS) cells. Specifically, a need exists for a system that takes advantage of unused space (e.g., "White Space") within the ESS cells to provide for the efficient and cost effective storage of downloadable content. To this extent, a need exists for a system that monitors the unused space within GSA cells, and manages the storage of new content to the unused space based on the monitoring and a storage policy that sets limits for the amount of unused space allowed to be consumed by the new content.

SUMMARY OF THE INVENTION

In general, the present invention provides a method, system and program product for storing/replicating downloadable content on a plurality of Enterprise Storage System (ESS) cells. Specifically, the present invention takes advantage of unused storage space within the ESS cells to provide for the efficient and cost effective storage of downloadable content. The system of the present invention generally includes a download grid manager that communicates with the ESS cells. Content to be replicated to the ESS cells, and characteristics corresponding thereto, are received on the download grid manager from a content owner (or the like). Based on the characteristics, a storage policy, and storage information previously received from the ESS cells, the download grid manager will replicate the downloadable content to unused storage space within the ESS cells. The storage policy generally indicates a limit of unused storage space within each ESS cell that downloadable content is permitted to occupy. As this process is performed for different sets of downloadable content, the download grid manager will receive feedback from the ESS cells. When the feedback indicates that downloadable content is approaching the limit indicated by the storage policy, the download grid manager will cease further replication to that ESS and/or delete downloadable content therefrom.

A first aspect of the present invention provides a method for storing downloadable content on a plurality of Enterprise Storage System (ESS) cells, comprising: receiving the downloadable content and characteristics corresponding to the downloadable content on a download grid manager; and replicating the downloadable content from the download grid manager to unused storage space of the plurality of ESS cells based on the characteristics and a storage policy, wherein the storage policy indicates a limit of the unused storage space on each of the plurality of ESS cells that the downloadable content is permitted occupy.

A second aspect of the present invention provides a method for storing downloadable content on a plurality of Enterprise Storage System (ESS) cells, comprising: receiving the downloadable content and characteristics corresponding to the downloadable content on a download grid manager; replicating the downloadable content from the download grid manager to unused storage space of the plurality of ESS cells based on the characteristics and a storage policy, wherein the storage policy indicates a limit of the unused storage space on each of the plurality of ESS cells that the downloadable content is permitted occupy; assigning the downloadable content a priority on the plurality of ESS cells, wherein the priority assigned to the downloadable content is lower than a priority of content stored within used storage space of the plurality of ESS cells; receiving feedback from the plurality of ESS cells indicating an amount of space used by the downloadable content; and managing the downloadable content on the plurality of ESS cells based on the feedback, the priority and the limit indicated in the storage policy.

A third aspect of the present invention provides a system for storing downloadable content on a plurality of Enterprise Storage System (ESS) cells, comprising: an input reception system for receiving the downloadable content and characteristics corresponding to the downloadable content on a download grid manager; and a content replication system for replicating the downloadable content from the download grid manager to unused storage space of the plurality of ESS cells based on the characteristics and a storage policy, wherein the storage policy indicates a limit of the unused storage space on each of the plurality of ESS cells that the downloadable content is permitted occupy.

A fourth aspect of the present invention provides a program product stored on a recordable medium for storing downloadable content on a plurality of Enterprise Storage System (ESS) cells, which when executed, comprises: program code for receiving the downloadable content and characteristics corresponding to the downloadable content on a download grid manager; and program code for replicating the downloadable content from the download grid manager to unused storage space of the plurality of ESS cells based on the characteristics and a storage policy, wherein the storage policy indicates a limit of the unused storage space on each of the plurality of ESS cells that the downloadable content is permitted occupy.

A fifth aspect of the present invention provides a system for deploying an application for storing downloadable content on a plurality of Enterprise Storage System (ESS) cells, comprising: a computer infrastructure being operable to: receive the downloadable content and characteristics corresponding to the downloadable content on a download grid manager; and replicate the downloadable content from the download grid manager to unused storage space of the plurality of ESS cells based on the characteristics and a storage policy, wherein the storage policy indicates a limit of the unused storage space on each of the plurality of ESS cells that the downloadable content is permitted occupy.

A sixth aspect of the present invention provides computer software embodied in a propagated signal for storing downloadable content on a plurality of Enterprise Storage System (ESS) cells, the computer software comprising instructions to cause a computer system to perform the following functions: receive the downloadable content and characteristics corresponding to the downloadable content on a download grid manager; and replicate the downloadable content from the download grid manager to unused storage space of the plurality of ESS cells based on the characteristics and a storage policy, wherein the storage policy indicates a limit of the unused storage space on each of the plurality of ESS cells that the downloadable content is permitted occupy.

Therefore, the present invention provides a method, system and program product for storing/replicating downloadable content to unused storage space of a plurality of Enterprise Storage System (ESS) cells.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections:
I. General Description
II. Download Grid
III Computerized Implementation 1. General Description As indicated above, the present invention provides a method, system and program product for storing/replicating downloadable content on a plurality of Enterprise Storage System (ESS) cells. Specifically, the present invention takes advantage of unused storage space within the ESS cells to provide for the efficient and cost effective storage of downloadable content. The system of the present invention generally includes a download grid manager that communicates with the ESS cells. Content to be replicated to the ESS cells, and characteristics corresponding thereto, are received on the download grid manager from a content owner (or the like). Based on the characteristics, a storage policy, and storage information previously received from the ESS cells, the download grid manager will replicate the downloadable content to unused storage space within the ESS cells. The storage policy generally indicates a limit of unused storage space within each ESS cell that downloadable content is permitted to occupy. As this process is performed for different sets of downloadable content, the download grid manager will receive feedback from the ESS cells. When the feedback indicates that downloadable content is approaching the limit indicated by the storage policy, the download grid manager will cease further replication to that ESS and/or or delete downloadable content therefrom.

It should be understood that a typical example of an ESS could be the Global Storage Architecture (GSA) provided by IBM Corp. of Armonk, N.Y. However, it should be appreciated that the teachings described herein could be used in conjunction with any type of grid computing environment.

II. Download Grid

As indicated above in conjunction with FIG. 1, it is often the case that many ESS cells have substantial unused storage space. For example, referring back to graph 10 of FIG. 1, it is noted that in the month of August, only 0.4 TB of the total available storage space for this ESS cell was being used. Given the total capacity of about 1.6 TB, the ESS cell of this example had approximately 1.2 TB of unused storage space or White Space. The present invention proposes to take advantage of this unused storage space without risking overuse, or in any way compromising the storage of content stored in the used storage space ESS cell.

Figure 2:
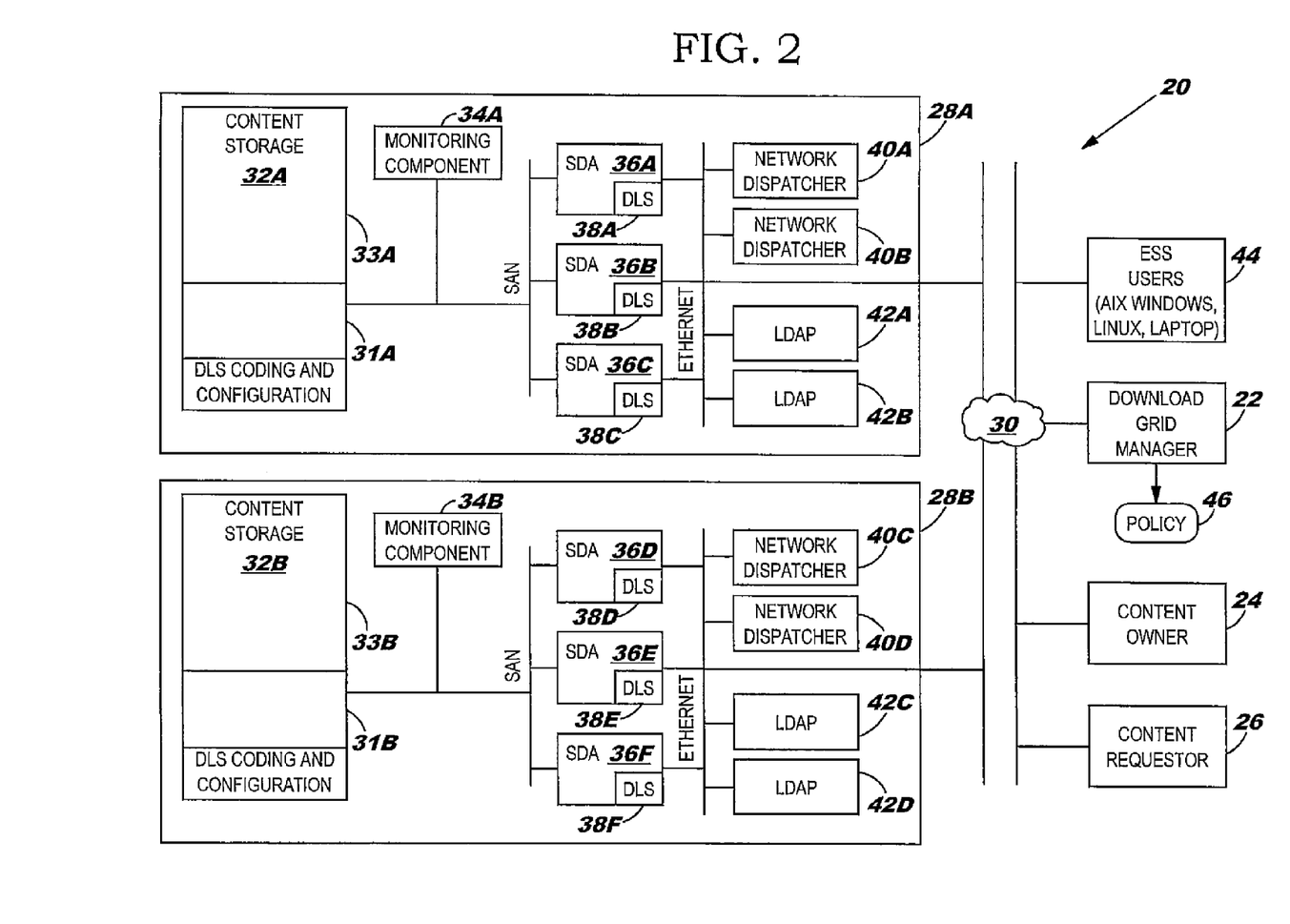
FIG. 2 depicts an illustrative system for replicating downloadable content to unused storage space within ESS cells according to the present invention.

Referring now to FIG. 2, an illustrative storage grid 20 according to the present invention is shown. As depicted, storage grid 20 includes a download grid manager (DGM) 22 that communicates with content owner 24, content requestor 26, ESS cells 28A-B, and ESS users 44 over network 30. In general, content owner 24 will provide content for storage in ESS cells 28A-B to DGM 22, while content requestor 26 can request the content from DGM 22. It should be understood in advance that two ESS cells 28A-B are shown for illustrative purposes only. To this extent, the teachings described herein could be carried out in conjunction with any quantity of ESS cells. It should also be understood that the communication/storage labels shown within ESS cells 28A-B (e.g., SAN and Ethernet) are shown to illustrate a typical embodiment only, and that the teachings described herein could be carried out with various other alternatives.

In any event, network 30 can be any type of network such as the Internet, a local area network (LAN), a wide area network (WAN), a virtual private network (VPN), etc. Communication between the components shown in FIG. 2 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, communication between the components could occur in a client-server or server-server environment.

Before a more detailed description of the components of ESS cells 28A-B are given, it should be understood that some of the components shown within ESS cells 28A-B also have an application for downloading stored content from ESS cells 28A-B to content requester 26 in chunks. Regardless, network dispatchers 40A-D generally provide load balancing with ESS cells 28A-B. As will be further described below, network traffic in the form of requests to store and download content occurs through ESS cells 28A-B. Network dispatchers 40A-D help balance the load created by such traffic, which helps prevent overload conditions from occurring. Lightweight Directory Access Protocol (LDAP) components 42A-D provide security to help ensure that only authorized parties (e.g., content owner 24, content requester 26 and ESS users 44) can access content stored in ESS cells 28A-B.

Service delivery agents 36A-F and download services (DLS) 38A-F facilitate communication between ESS cells 28A-B and DGM 22. Those components are also discussed in detail in the pending application that was cross-referenced and incorporated above. In the that application, it is discussed how service delivery agents (SDAs) 36A-F and download services (DLSs) 38A-F allow content such as files requested by content requester 26 to be retrieved in chunks from multiple ESS cells 28A-B (e.g., instead of retrieving the entire file from a single ESS cell). For example, if content requester 26 requested a certain file, the request would be received by DGM 22, which would communicate with DLS 38A-F. Instead of obtaining the entire file from one ESS, the file would be obtained in chunks from multiple different ESS's. For example, one half of the file could be retrieved from ESS 28A, while the other half is retrieved from ESS 28B.

Under the present invention, the communication between SDAs 36A-F, DLSs 38A-F, and DGM 22 is further used to optimize the storage of downloadable content in the unused storage space 33A-B of content storage units 32A-B of ESS cells 28A-B. Specifically, under the present invention, monitoring components 34A-B will monitor "storage information" corresponding to content storage units 32A-B. This "storage information" typically describes the total storage space and unused storage space 33A-B within storage units 32A-B. After being determined by monitoring components 34A-B, the "storage information" will be communicated to SDAs 36A-F, to DLSs 38A-F, and then to DGM 22.

It should be appreciated that content storage units 32A-B can be any systems (e.g., databases, etc.) capable of providing storage of content (e.g., both downloadable and non-downloadable) under the present invention. As depicted, content storage units 32A-B include used storage space 31A-B and unused storage space 33A-B, which are typically broken down into file systems. For example, assume content storage unit 32A has a total 300 GB of unused storage space 33A. Further assume that the total unused storage space 33A is broken down into three file systems. In this case, each file system could have 100 GB of unused storage space. Included within used storage space 31A-B is "DLS coding and configuration." The DLS coding and configuration controls DLSs 38A-F to allow a single piece of content to be provided to content requester 26 in chunks from multiple different cells such as ESS cells 28A-B. Still further, storage units 32A-B could include one or more storage devices, such as a magnetic disk drive or an optical disk drive. In another embodiment, storage units 32A-B include data distributed across, for example, a local area network (LAN), wide area network (WAN) or a storage area network (SAN) (not shown).

Under the present invention, when content owner 24 wishes to store the downloadable content in ESS cells 28A-B, he/she will communicate the downloadable content along with corresponding characteristics to DGM 22. Such characteristics can include, among others, a size of the downloadable content to be stored, a geographic location (e.g., of content owner 24), etc. Upon receipt, DGM 22 will replicate the content to the unused storage space 33A-B of ESS cells 28A-B based on the characteristics, the storage information provided by monitoring components 34A-B, and a storage policy 46. In general, the storage policy 46 sets forth a limit of the unused storage space 33A-B that is permitted to occupied by downloadable content from DGM 22. For example, the storage policy 46 could state that DGM 22 can use up to a certain quota (e.g., 80%) of the total unused storage space 33A-B in any ESS file system, not to exceed a certain amount (e.g., 250 GB) in each. In addition, the storage policy could dictate that if the unused storage space 33A in any file system drops below a certain minimal threshold (e.g., 100 GB), the allocation can be reduced regardless of the percentage of unused storage space in that file system. Thus, for example, if a particular file system (e.g., file system "X" of unused storage space 33A) has a total of 120 GB in unused storage space 33A, the 80% rule would permit 96 GB to be used by DGM 22. However, after using 21 GB, the total unused storage space 33A for that file system would fall to 99 GB (e.g., below the 100 GB minimal threshold. Thus, even though DGM 22 has not consumed 80% of the total unused space 33A in that file system, DGM 22 could begin to route downloadable content to other file systems. Example logic for an illustrative storage policy 46 could be as follows:

```
DownLoadGridmaxGB=250
DownLoadGridmaxpercent=0.8
FilesystemMinFreeGB=100
if (FilesystemFreeGB > 100) then
    if ((FilesystemFreeGB *  DownLoadGridMaxPercent) >
```

-continued

```
        DownLoadGridMaxGB)      then
            DownLoadGridStorage = DownLoadGridMaxGB
        /* Lots of space */
            else
                DownLoadGridStorage = (FilesystemFreeGB *
                DownLoadGridMaxPercent)
        /* A percentage of free space */
            endif
            if ((FilesystemFreeGB - DownLoadGridStorage) <
FilesystemMinFreeGB)
            then
                DownLoadGridStorage = (FreeFilesystemGB -
                FilesystemMinFreeGB)
        /* Ensure at least 100 GB free */
            endif
        else
            DownLoadGridStorage = 0
        /* Not enough Free Space */
        endif
```

The below table illustrates actions that can be taken based on the storage policy 46:

| Cell Free Space | Space Quota | Space Used | Action |
| --- | --- | --- | --- |
| 1300 GB | 500 GB | 0 GB | Initial Setup |
| 700 GB | 500 GB | 200 GB | Storage Increase |
| 500 GB | 500 GB | 400 GB | Storage Increase |
| 200 GB | 500 GB | 400 GB | Decrease Quota |
| 400 GB | 300 GB | 300 GB | Decrease Grid |
| 700 GB | 500 GB | 300 GB | Increase Quota |

Based on storage policy 46, the storage information and the characteristics, DGM 22 will replicate the downloadable content provided by content owner 24 to unused storage space 33A-B within ESS cells 28A-B. For example, in choosing ESS cells 28A-B for replicating the downloadable content, DGM 22 will analyze the characteristics provided by content owner 24. As mentioned above, such characteristics could include, among other things, the size of the downloadable content, geographic location of content owner 24 (e.g., so that the content can be replicated to the cells closest to content owner 24), etc. In addition, before ESS cells 28A-B can be selected as replication sites for the downloadable content, DGM 22 will examine the storage information received from ESS cells 28A-B in view of the storage policy 46 to ensure that ample space is available, and no storage rules contained within the storage policy 46 will be broken.

As indicated above, two ESS cells 28A-B are shown herein for illustrative purposes. The teachings of the present invention could be carried out in conjunction with any quantity of ESS cells 28A-B. To this extent, although the downloadable content will be replicated to multiple ESS cells, it is not necessary for the downloadable content to be replicated to every ESS cell in a download grid. For example, if a download grid includes 100 ESS cells, the downloadable content might not be replicated to each and every ESS cell.

Regardless, assume in this example that both ESS 28A and ESS cell 28B were selected by DGM 22. In this event, the downloadable content would be replicated to the unused storage space 33A-B within content storage units 32A-B. In performing the replication operation, DGM 22 will also assign the downloadable content a priority that is lower than a priority of content already stored in the used storage space 33A-B of ESS cells 28A-B. This helps ensure that the usage of unused storage space 33A-B will be subservient to the content in used storage space 31A-B, thus, preventing any conflicts and preserving the integrity of the content in the used storage space 31A-B.

Once replication has been complete, the content is available for download in chunks from the multiple locations, as opposed to retrieving the entire piece of content from a single location. For example, if content requestor 26 wished to download the content, security verification would first be performed by LDAPs 42A-D. Assuming content requestor 26 was authorized to access that downloadable content, it would be retrieved to content requestor 26 in chunks from multiple locations (e.g., ESS cells 28A-B). Downloading content to content requester 26 in chunks provides several advantages. First, bandwidth is saved because the entire piece of content is not communicated through one pipeline, rather, smaller chunks of the content are communicated through multiple different communication pipelines. In addition, because the content is taken in smaller chunks, download time is reduced when compared with downloading the entire file in one large chunk. A more detailed description of the process of downloading content in chunks is provided in the above-cross-referenced and incorporated patent application.

In any event, as DGM 22 replicates downloadable content to unused storage space 33A-B of ESS cells 28A-B in this manner, monitoring components 34A-B will continue to monitor the storage within ESS cells 28A-B. Specifically, monitoring components 34A-B will examine the amount of unused storage space being utilized by DGM 22, and provide feedback based thereon. Similar to the storage information, this feedback will be routed through SDAs 36A-F and DLSs 38A-F to DGM 22. Based on the feedback, the storage policy 46 and the lower priority assigned to the downloadable content, DGM 22 will manage the downloadable content accordingly. For example, if the feedback indicates that the limit set forth in the storage policy has been or is about to be exceeded for ESS cell 28A, DGM 22 can decrease the quota for ESS cell 28A by deleting downloadable content therefrom and/or relocating downloadable content to another ESS cell (not shown). The feedback can also work to increase the replication to a certain ESS cells. For example, if the feedback indicates that a higher amount of unused storage space is available in ESS cell 28A, DGM 22 can increase its quota for ESS cell 28A.

It should be appreciated that in monitoring content storage units 32A-B and providing feedback to DGM 22, monitoring components 34A-B could have access to storage policy 46. This would allow monitoring components 34A-B to provide DGM 22 with "smart" feedback and even a preferred course of action to take (e.g., storage limit of ESS cell "Y" being approached, delete file "X" from ESS cell "Y").

III. Computerized Implementation

Figure 3:
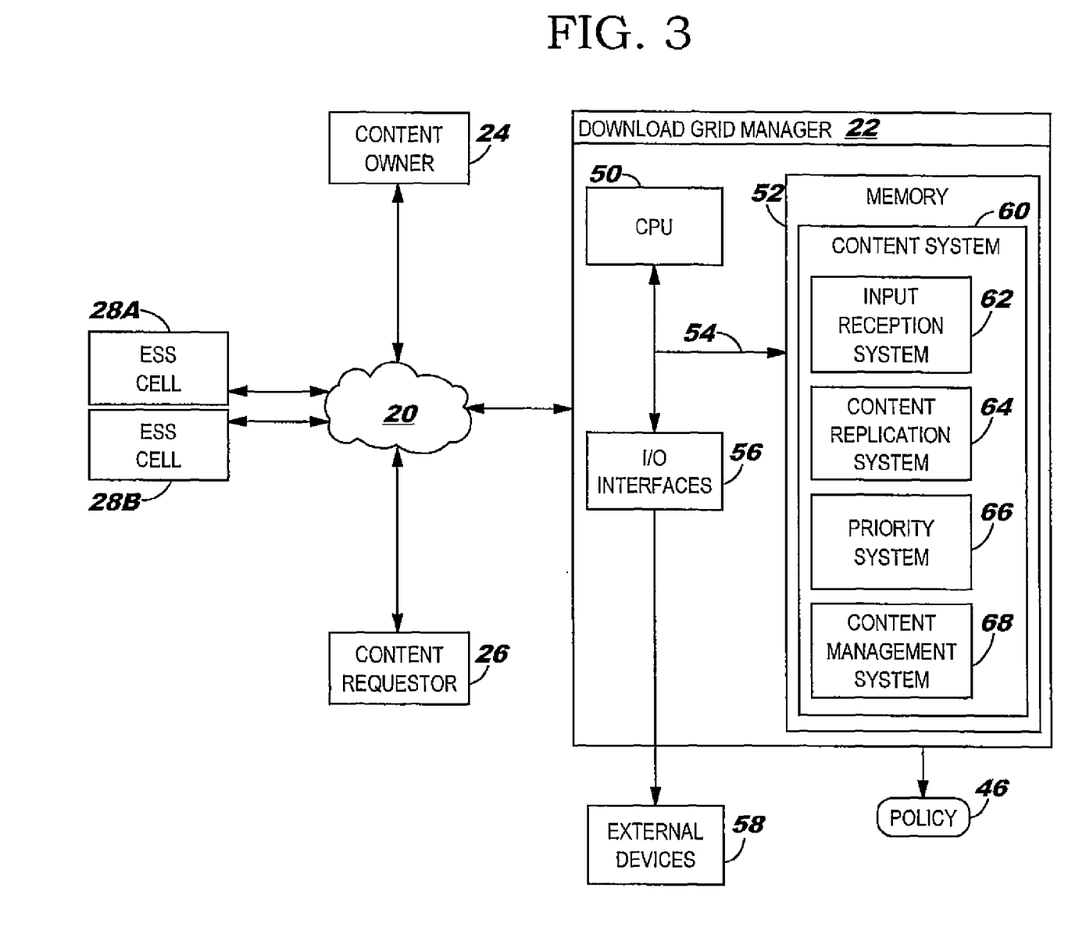
FIG. 3 depicts the download grid manager of FIG. 2 in greater detail.

Referring now to FIG. 3, a computerized implementation of DGM 22 is shown.

As depicted, DGM 22 generally includes central processing unit (CPU) 50, memory 52, bus 54, input/output (I/O) interfaces 56 and external devices/resources 58. CPU 50 may comprise a single processing unit, or be distributed across one or more processing units in one or more locations, e.g., on a client and server. Memory 52 may comprise any known type of data storage and/or transmission media, including magnetic media, optical media, random access memory (RAM), read-only memory (ROM), a data cache, a data object, etc. Moreover, similar to CPU 50, memory 52 may reside at a single physical location, comprising one or more types of data storage, or be distributed across a plurality of physical systems in various forms.

I/O interfaces 56 may comprise any system for exchanging information to/from an external source. External devices/resources 58 may comprise any known type of external device, including speakers, a CRT, LED screen, hand-held device, keyboard, mouse, voice recognition system, speech output system, printer, monitor/display, facsimile, pager, etc. Bus 54 provides a communication link between each of the components in DGM 22 and likewise may comprise any known type of transmission link, including electrical, optical, wireless, etc. Although not shown, additional components, such as cache memory, communication systems, system software, etc., may be incorporated into DGM 22. In addition, any computer systems operated by content owner 24 and content requester 26 will likely include computerized components similar to DGM 22. Still further, ESS users 44 (FIG. 2) have not been depicted in FIG. 3 for simplicity purposes.

Shown in memory 52 of DGM as a program product is content system 60. In general, content system 60 includes program code for carrying out the content storage functions described above. Specifically, content system 60 is shown as including input reception system 62, content replication system 64, priority system 66 and content management system 68. It should be understood, that although not shown, DGM 22 will also likely include program code for carrying out the retrieval of content in chunks from ESS cells 28A-B.

In any event, as described above, when content owner 24 wishes to store downloadable content on ESS cells 28A-B, he/she will submit the content along with corresponding characteristics to DGM 22. The downloadable content and characteristics will be received by input reception system 62. Upon receipt, content replication system 64 will identify the ESS cells that are best suited for replication of the downloadable content. This determination is generally made based on the characteristics, storage policy 46 and storage information as received from ESS cells 28A-B (e.g., as monitored by the monitoring components therein). Assuming that ESS cells 28A-B were selected for the replication, content replication system 64 would then replicate the content to the unused storage space therein. In addition, priority system 66 would assign the downloadable content a priority that is lower than a priority of content already stored in the used storage space of ESS cells 28A-B.

As these operations continue over time, content management system 68 will continually manage the downloadable content within unused storage space of ESS cells 28A-B to ensure that storage of the higher priority content is never compromised. Specifically, content management system 68 will receive feedback as provided by the monitoring components of ESS cells 28A-B. Based on the feedback, the storage policy and the priority, content management system 68 will manage the downloadable content accordingly. As indicated above, this could involve deleting downloadable content from an ESS cell, moving downloadable content to another ESS cell (not shown), or even increasing storage to unused storage space of an ESS cell.

It should be understood that the present invention can be realized in hardware, software, a propagated signal, or any combination thereof. Any kind of computer/server system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagate signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of content system 60 of FIG. 3 is intended to be illustrative only. As such, content system 60 could be represented by a different configuration of systems. Moreover, content system 60 could be implemented in conjunction with a system/program code for retrieving content in chunks from ESS cells 28A-B.

We claim:

1. A method for storing downloadable content on a plurality of Enterprise Storage System (ESS) cells to which content is assigned based on proximity to a geographic location of the sender, the plurality of ESS cells being cells that are dedicated to the ESS in a grid having service delivery agents and download services that allow requested content to be retrieved in chunks from multiple ESS cells, comprising:

receiving the downloadable content and characteristics corresponding to the downloadable content on a download grid manager; and replicating the downloadable content from the download grid manager to unused storage space of the plurality of ESS cells based on the characteristics and a storage policy that indicates a limit of the unused storage space on each of the plurality of ESS cells that the downloadable content is permitted occupy, by:

determining whether an ESS cell to which the content is assigned based on the proximity of the ESS cell being greater than a proximity of a different ESS cell to the geographic location of the sender fails to comply with the storage policy;

based on a determination that the ESS cell fails to comply, replicating the downloadable content to at least one other ESS cell in the plurality of ESS cells that is less proximate to the geographic location of the sender than the ESS cell; and otherwise, replicating the content to the ESS cell to which the content is assigned based on the proximity of the ESS cell to the geographic location of the sender, wherein the download grid manager manages the downloadable content by at least one of: deleting the downloadable content from one of the plurality of ESS cells or moving the downloadable content to another ESS cell, based on the priority, the limit, and the feedback.

2. The method of claim 1, further comprising:

monitoring the storage within the plurality of ESS cells; and providing feedback to the download grid manager based on the monitoring.

3. The method of claim 2, wherein the monitoring is performed by a monitoring component within each of the ESS cells, and wherein the feedback is communicated from the monitoring component to a set of download services within each of the plurality of ESS cells and then from the set of download services to the download grid manager.

4. The method of claim 2, further comprising deleting the downloadable content from one of the plurality of ESS cells when the feedback indicates that the limit of the storage policy is exceeded for the one ESS cell.

5. The method of claim 1, wherein the characteristics of the downloadable content comprise at least one characteristic selected from the group consisting of a size of the downloadable content, and a geographic scope of the downloadable content.

6. The method of claim 1, wherein the limit is expressed within the storage policy as a total amount of unused storage space and a quota of the unused storage space permitted to be used by the downloadable content.

7. The method of claim 1, further comprising receiving storage information on the download grid manager from the plurality of ESS cells prior to the receiving step, wherein the downloadable content is replicated to the unused storage space based further on the storage information.

8. A system for storing downloadable content on a plurality of Enterprise Storage System (ESS) cells to which content is assigned based on proximity to a geographic location of the sender, the plurality of ESS cells being cells that are dedicated to the ESS in a grid having service delivery agents and download services that allow requested content to be retrieved in chunks from multiple ESS cells, comprising:
   an input reception system for receiving the downloadable content and characteristics corresponding to the downloadable content on a download grid manager; and
   a content replication system for replicating the downloadable content from the download grid manager to unused storage space of the plurality of ESS cells based on the characteristics and a storage policy that indicates a limit of the unused storage space on each of the plurality of ESS cells that the downloadable content is permitted occupy, by:
      determining whether an ESS cell to which the content is assigned based on the proximity of the ESS cell being greater than a proximity of a different ESS cell to the geographic location of the sender fails to comply with the storage policy;
      based on a determination that the ESS cell fails to comply, replicating the downloadable content to at least one other ESS cell in the plurality of ESS cells that is less proximate to the geographic location of the sender than the ESS cell; and
      otherwise, replicating the content to the ESS cell to which the content is assigned based on the proximity of the ESS cell to the geographic location of the sender,
   wherein the download grid manager manages the downloadable content by at least one of: deleting the downloadable content from one of the plurality of ESS cells or moving the downloadable content to another ESS cell, based on the priority, the limit, and the feedback.

9. The system of claim 8, further comprising a monitoring component for monitoring storage within the plurality of ESS cells, wherein feedback is provided to the download grid manager based on the monitoring.

10. The system of claim 9, wherein, for each of the plurality of ESS cells, the feedback is communicated from the monitoring component to a set of download services within each of the plurality of ESS cells, and then from the set of download services to the download grid manager.

11. The system of claim 9, further comprising a content management system that deletes the downloadable content from one of the plurality of ESS cells when the feedback indicates that the limit of the storage policy is exceeded for the one ESS cell.

12. The system of claim 8, wherein the characteristics of the downloadable content comprise at least one characteristic selected from the group consisting of a size of the downloadable content, and a geographic scope of the downloadable content.

13. The system of claim 8, wherein the limit is expressed within the storage policy as a total amount of unused storage space and a quota of the unused storage space permitted to be used by the downloadable content.

14. The system of claim 8, wherein the input reception system further receives storage information from the plurality of ESS cells, and wherein the downloadable content is replicated to the unused space based on the storage information.

15. A program product stored on a computer recordable storage medium for storing downloadable content on a plurality of Enterprise Storage System (ESS) cells to which content is assigned based on proximity to a geographic location of the sender, the plurality of ESS cells being cells that are dedicated to the ESS in a grid having service delivery agents and download services that allow requested content to be retrieved in chunks from multiple ESS cells, which when executed, comprises:
   program code for receiving the downloadable content and characteristics corresponding to the downloadable content on a download grid manager; and
   program code for replicating the downloadable content from the download grid manager to unused storage space of the plurality of ESS cells based on the characteristics and a storage policy that indicates a limit of the unused storage space on each of the plurality of ESS cells that the downloadable content is permitted occupy, by:
      determining whether an ESS cell to which the content is assigned based on the proximity of the ESS cell being greater than a proximity of a different ESS cell to the geographic location of the sender fails to comply with the storage policy;
      based on a determination that the ESS cell fails to comply, replicating the downloadable content to at least one other ESS cell in the plurality of ESS cells that is less proximate to the geographic location of the sender than the ESS cell; and
      otherwise, replicating the content to the ESS cell to which the content is assigned based on the proximity of the ESS cell to the geographic location of the sender,
   wherein the download grid manager manages the downloadable content by at least one of: deleting the downloadable content from one of the plurality of ESS cells or moving the downloadable content to another ESS cell, based on the priority, the limit, and the feedback.

16. The program product of claim 15, further comprising program code for monitoring the storage within the plurality of ESS cells, wherein feedback is provided to the download grid manager based on the monitoring.

17. The program product of claim 16, wherein, for each of the plurality of ESS cells, the feedback is communicated from the program code for monitoring to a set of download services within each of the plurality of ESS cells, and then from the set of download services to the download grid manager.

18. The program product of claim 16, further comprising program code for managing, wherein the program code for managing deletes the downloadable content from one of the plurality of ESS cells when the feedback indicates that the limit of the storage policy is exceeded for the one ESS cell.

19. The program product of claim 15, wherein the characteristics of the downloadable content comprise at least one characteristic selected from the group consisting of a size of the downloadable content, and a geographic scope of the downloadable content.

20. The program product of claim 15, wherein the limit is expressed within the storage policy as a total amount of unused storage space and a quota of the unused storage space permitted to be used by the downloadable content.

21. The program product of claim 15, wherein the program code for receiving further receives storage information from the plurality of ESS cells, and wherein the downloadable content is replicated to the unused space based on the storage information.

22. A system for deploying an application for storing downloadable content on a plurality of Enterprise Storage System (ESS) cells to which content are assigned based on proximity to a geographic location of the sender, the plurality of ESS cells being cells that are dedicated to the ESS in a grid having service delivery agents and download services that allow requested content to be retrieved in chunks from multiple ESS cells, comprising:
- a computer infrastructure that includes a computer device, the computer infrastructure being operable to:
  - receive the downloadable content and characteristics corresponding to the downloadable content on a download grid manager; and
  - replicate the downloadable content from the download grid manager to unused storage space of the plurality of ESS cells based on the characteristics and a storage policy that indicates a limit of the unused storage space on each of the plurality of ESS cells that the downloadable content is permitted occupy, by:
    - determining whether an ESS cell to which the content is assigned based on the proximity of the ESS cell being greater than a proximity of a different ESS cell to the geographic location of the sender fails to comply with the storage policy;
    - based on a determination that the ESS cell fails to comply, replicating the downloadable content to at least one other ESS cell in the plurality of ESS cells that is less proximate to the geographic location of the sender than the ESS cell; and
    - otherwise, replicating the content to the ESS cell to which the content is assigned based on the proximity of the ESS cell to the geographic location of the sender,
- wherein the download grid manager manages the downloadable content by at least one of: deleting the downloadable content from one of the plurality of ESS cells or moving the downloadable content to another ESS cell, based on the priority, the limit, and the feedback.

* * * * *